United States Patent Office 2,888,417
Patented May 26, 1959

2,888,417

LIQUID POLYDIENE COATING MODIFIED WITH OIL MODIFIED ALKYD RESIN

Willie W. Crouch, Bartlesville, Okla., assignor to Phillips Petroleum Company, a corporation of Delaware No Drawing. Application June 10, 1955
Serial No. 514,690

9 Claims. (Cl. 260—22)

This invention relates to a polymeric coating composition. In one of its aspects, this invention relates to an improved coating composition for metal surfaces having excellent wedge bend characteristics.

Liquid polymers of conjugated dienes, such as liquid polybutadiene, and liquid copolymers of such conjugated dienes and monomers copolymerizable therewith, have come into prominence in recent years as coating materials. Such coatings have excellent adhesion to surfaces and particularly to metal surfaces, and impart excellent protection of the metal against sulfide stain. While coatings from these materials have numerous advantages, they are lacking in flexibility, and for this reason, coatings of food containers lined therewith are frequently damaged in fabrication operations.

The problem involved in providing a satisfactory coating for food cans must be considered from two distinctly different viewpoints, the first being that of the can manufacturer, the second that of the food processor. A satisfactory coating material must be of such nature that in the fabrication of cans from precoated tin plate, breaking the coating does not occur. It must also withstand processing conditions such that it does not lose adhesiveness to the interior of the can and that staining of the metal does not occur from the contents. Many coating compositions excel in one or the other of these properties but are inferior in the other. For example, tin plate coated with commercial "R" enamel (an oleoresinous type varnish) has a wedge bend value of $10/16$ inch, indicating excellent fabrication properties. On the other hand, after processing for 60 minutes at 250° F. in dog food, the adhesiveness of this coating by the "Scotch" tape method has a value of 0 on a scale of from 0 to 100, and a sulfide stain value of 3 to 4 on a scale of from 0 to 5, both regarded as unacceptable by the trade.

Coatings prepared from liquid polybutadiene, on the other hand, have shown excellent processing properties. Test after 60 minutes processing in dog food at 250° F. shows a "Scotch" tape adhesion value of 100 and sulfide stain value of zero to one, obviously outstandingly good. However, wedge bend values on the coated plate are in the vicinity of $25/16$ inch, distinctly marginal from a fabrication viewpoint.

A coating which is acceptable for metal to be made into cans and the like should meet the following specification:

Adhesion by the "Scotch" tape
  method _____ [1] Not less than 90
Sulfide stain _____ [1] Not more than 3
Wedge bend _____ Not more than $23/16$

[1] After 60 minutes processing a high sulfur food such as dog food at 250° F.

It is frequently necessary to sacrifice in one property to meet the specification in another property. The ideal, of course, would be to have 100% adhesion, zero sulfide staining and zero wedge bend, an ideal never reached in commercial practice.

The adhesion test has been developed by the trade which comprises applying a pressure sensitive cellulose tape such as "Scotch" brand tape to the coating and then pulling the tape off. The result is recorded in percent coating uneffected. That is 100 is 100% adhesion while zero is 100% removed. In the above specification, the adhesion is after processing.

The sulfide stain test is also known to the trade and consists of processing a high sulfur food such as dog food for 60 minutes at 250° F. The severity of stain is comparative and is recorded as an arbitrary figure from 0 to 5. Zero is no staining and 5 is severe or complete staining.

An object of this invention is to provide a coating composition of superior fabricating properties.

Another object of this invention is to provide for improving the fabricating qualities of a coating comprising a liquid polymer of a conjugated diene.

Another object of this invention is to provide for the modification of liquid polymers of a conjugated diene to produce a superior coating composition.

Still another object of this invention is to provide an improved coating for cans to be used in food processing.

Still another object of this invention is to provide a coated can being particularly suited for processing and storing food.

Still other objects, advantages and features of this invention will be apparent to those skilled in the art having been given this disclosure.

In accordance with my invention, a composition comprising a liquid polymer of a conjugated diene has incorporated therein, an oil modified alkyd resin to the extent of 1 to 30 weight percent based on the total nonvolatile constituents.

Coating compositions having a wide range of wedge bend characteristics can be produced by the method of this invention by the proper selection of alkyd, liquid polymer of a diene and ratios of one to the other. That is, it will be desirable in some applications to have a coating of relatively low wedge bend, while in other applications, it is desirable to have relatively high wedge bend characteristics.

I have found that a satisfactory coating for metal to be processed in shapes such as cans is prepared from a liquid polymer of a conjugated diene having incorporated therein an oil modified alkyd resin to the extent of 1 to 30 weight percent based on the total nonvolatile constituents and in particular an outstanding coating material is produced when the composition comprises 10 to 25 weight percent alkyd resin.

In one embodiment of this invention, a coated article is formed by incorporating into a liquid polymer prepared from monomers comprising a conjugated diene the desired amount of the oil modified alkyd resin, coating the article with the resulting mixture and thermally setting the resulting coating. The composition is generally used in solutions preferably in the range of 20 to 70 weight percent of non-volatiles, however, greater or lesser dilutions can be made or the composition can be used in the absence of any solvent. Both aromatic and aliphatic type solvents are applicable, but the solvent chosen should dissolve all of the polymeric ingredients including the alkyd resin and should be volatile at the curing temperature. Hydrocarbon solvents are frequently preferred and include such solvents as toluene, xylene, benzene, Stoddard solvent, heptane, mineral spirits and the like. The formulation of the coating compositions of this invention can be carried out in a variety of ways. For example, the alkyd can be prepared and then mixed with the liquid polymer of the conjugated diene in a suitable proportion, or the liquid polymer can be admixed with any one of the alkyd reactants after which the ester interchange with the other reactants can be carried out.

The coating compositions of this invention can be applied to the surface to be coated by any of the well-known methods for applying coatings, such as brushing, dipping, spraying, roller-coating, and the like. In the coating of metal strips, roller-coating is generally preferred. Following the application of the liquid polymer containing the modified alkyl resin, the coating is thermally set by subjecting the coating to a temperature generally in the range between 65° F. and 600° F. until set. However, higher temperatures or even flame curing such as described in the copending application of L. O. Edmonds, filed February 21, 1955, and having Serial No. 489,650, can be employed. The time can be as short as two minutes or less, or up to 12 hours, or even more, it being understood by those skilled in the art that the time will be dependent upon the temperature employed for a given composition.

The coating compositions of this invention are particularly suitable for coating sheet metal such as tinned plate, bonderized steel and the like. The amount of coating composition applied will vary according to the intended use of the coated metal. In general, coated metal from which cans are to be fabricated will be coated with a film having a weight in the range 1 to 10 milligrams per square inch, while other types of coating can have a film weight as high as 25 milligrams per square inch, or higher. Such cans are especially suitable for food processing since they have good sulfide stain resistance and the coatings have high adhesion to the metal. Sulfide stain is due to failure of the coating and sulfide attack on the metal of the cans.

Driers such as linoleates or naphthenates of metals such as lead, cobalt, manganese and the like, can be incorporated into the coating composition if desired, in which case, the temperature required to thermally set the coating is greatly reduced.

The liquid polymer has an average molecular weight within the range of 300 to 3000, and a viscosity generally in the range of 100 to 6000 Saybolt Furol seconds as measured at 100° F.

The liquid polymer can be a polymer of the conjugated diene alone, or a polymer of the conjugated diene with a minor proportion of one or more monoolefins copolymerizable therewith and containing the group $CH_2=C<$, such as styrene, methyl substituted styrenes, and the like. Preferably the monomer being polymerized will comprise at least 70 weight percent of such conjugated dienes.

The liquid polymer employed in the process of my invention can be produced from a conjugated diene, a mixture of conjugated dienes, or a mixture comprising a conjugated diene along with other copolymerizable monomers. The liquid polymer to be employed as a coating is preferably prepared by mass polymerization in the presence of a finely divided alkali metal catalyst. However, liquid polymers prepared by other methods such as aqueous emulsion polymerization in the presence of relatively large amounts of modifiers such as mercaptans and those liquid polymers produced in the presence of hydrofluoric acid as a catalyst are benefited by incorporating alkyd resin according to this invention.

When employing emulsion polymerization, a sufficiently large amount of modifier is utilized, such as 3 to 10 parts by weight of an alkyl mercaptan per 100 parts of monomer, to provide liquid polymer having the desired characteristics.

One method of preparing the preferred liquid polymer is disclosed in my U.S. Patent 2,631,175, issued March 10, 1953, to Willie W. Crouch. In the procedure referred to in that patent, a conjugated diene of about 98 percent purity or higher is polymerized alone, or together with a minor proportion of a monomer copolymerizable therewith, and containing the group $CH_2=C<$, such as styrene, methyl substituted styrenes, and the like in the presence of a finely divided alkali metal catalyst and a suitable diluent, under carefully controlled reaction conditions, particularly temperature, catalyst condition and concentration, quantity of solvent, and rate of conjugated diene addition. In the preparation of a copolymer, the major polymerizable ingredient is a conjugated diene and such conjugated dienes are present in an amount which exceeds 50 weight percent of the monomeric material. The polymer thus produced is a substantially colorless transparent liquid. The viscosity of the liquid polymer for a given amount of catalyst is, in a large part, proportional to the selected particle size of the catalyst, being generally within the limits of from 100 to 6000 and often from 100 to 2000 Saybolt Furol seconds as measured at 100° F. Reaction temperatures employed are generally within the limits of 60 to 110° C. The time required to carry out the polymerization, exclusive of the initial induction period, does not generally exceed 8 hours, and is generally below 4 hours.

When employing hydrofluoric acid as a catalyst, a liquid polymer can be prepared by mass polymerization, conducted in an inert solvent, at a temperature within the limits of about −110 to 20° F. This method is discussed in detail in U.S. Patent 2,550,695, issued May 1, 1951, an application of J. C. Hillyer and J. F. Wilson.

I find that in the production of improved coating compositions of my invention, those having the most desirable coating characteristics are formed when employing a liquid polymer reactant having a viscosity and molecular weight within the ranges above described, and a specific gravity 60/60 F., within the limits of 0.85 to 0.95. The liquid polymer generally used and preferred for coating composition is a homopolymer of 1,3-butadiene, however, other conjugated dienes such as 2,3-dimethyl-1,3-butadiene, isoprene, piperylene, and the like can also be used. Furthermore, copolymers of one or more of such conjugated dienes with polymerizable monomers such as styrene, various alkyl substituted styrenes and the like are applicable. The liquid polymer can be further processed such as by gas stripping or by extraction if so desired.

The alkyd resins useful in this invention are prepared by the reaction of polyhydric alcohol with polycarboxylic acids, preferably produced by the esterification of a dicarboxylic acid with a glycerol, modified with a vegetable oil. The vegetable oils used in this invention are preferably those oils which promote the formation of drying resins such as cocoanut, soybean, linseed, dehydrated castor, tung, perilla, oiticica, sunflower, safflower, walnut and China-wood oils. These drying oils are generally used in the range between 2:1 and 6:1 weight parts of oil to the glycol.

The polyhydric alcohols with which we are primarily concerned will generally contain no more than 15 carbon atoms per molecule. Examples of such polyhydric alcohols include glycols such as ethylene glycol, propylene glycol, diethylene glycol, alpha-butylene glycol, tetramethylene glycol, triethylene glycol, hexamethylene glycol, diphenyl propane diol, etc., and more highly hydroxylated alcohols such as glycerol, erithritol, pentaerythritol, ribitol, sorbitol, allitol, inositol, scyllitol, etc. Alcohols containing only one hydroxy group per molecule can also be present, but it is to be understood that the total amount of such alcohols is not generally used in an amount exceeding 5 weight percent of the total alcohol. Examples of such monohydroxy alcohols include methyl alcohol, ethyl alcohol, n-propyl alcohol, isopropyl alcohol, sec-butyl alcohol, tert-butyl alcohol, isoamyl alcohol, octyl alcohol, myristyl alcohol, benzyl alcohol, cyclohexanol, furfuryl alcohol, etc.

The monohydric alcohols serve as chain terminators and, if used in too large quantities, will give products with undesirably low molecular weights and for this reason, are not generally used in quantities exceeding 5 weight percent of total alcohols.

The polycarboxylic acids with which this invention is primarily concerned are dicarboxylic acids including the anhydrides generally containing not more than 15 carbon atoms per molecule. Such acids include unsaturated dicarboxylic acids such as maleic, fumaric, itaconic, citraconic, mesaconic, ethylmaleic, methylethylmaleic, diethylmaleic, glutaconic, alpha-methylglutaconic, alpha,alpha'-dimethylglutaconic, beta-methylglutaconic, alpha, alpha-dimethylglutaconic, alpha, beta, gamma-tributylglutaconic, 1,2-dihydromuconic, 2-octenedioic, 2-heptenedioic, 2-pentadecenedioic and similar dicarboxylic acids and saturated dicarboxylic acids such as phthalic, terephthalic, mellitic, succinic, adipic, azelaic, sebacic, itaconic, citraconic, and maleic acids. In the case of all acids, the anhydride can be used. Also applicable are those acids containing three or more carboxy groups such as tricarballylic acid. In addition to the polycarboxylic acids, certain modifying acids can be used. These modifying acids will generally contain no more than 20 carbon atoms per molecule and include saturated or unsaturated monocarboxylic acids. In the case of these modifying acids, the amount will generally not exceed about 5 weight percent. Examples of these modifying acids include formic, acetic, propionic, butyric, isobutyric, valeric, caprylic, pelargonic, capric, myristic, stearic, arachidic, oleic, acrylic, ethacrylic, benzoic, toluic and salicyclic acids. It should be understood that the anhydrides of these acids are included.

Like the alcohols, the monocarboxylic acids are chain breakers and are generally not used in more than 5 weight percent based on total acids.

It is within the scope of this invention to use a mixture of alcohols and a mixture of acids or a mixture of both. In general, the acids and alcohols selected will be so chosen so as to produce polyester resins having a molecular weight no greater than 8,000. It is also within the scope of this invention to halogenate or substitute other non-interfering groups on the polyester resin. Liquid polymers of 1,3-butadiene are particularly suited for the conjugated diene polymer of this invention. I will further describe this invention with the following examples, using liquid polybutadiene as the particular liquid polymer.

EXAMPLE I

A coating composition was made up containing 400 grams of liquid polybutadiene and 200 grams of Stoddard solvent. The liquid polybutadiene used was prepared by mass polymerization using finely divided sodium as a catalyst, and had an approximate Saybolt Furol viscosity at 100° F. of 1500 seconds and a Gardner color of 11. This coating composition was roller coated onto a strip of tinned steel using a roller setting of 0.003 inch. The coated strip was then baked at 400° F. for 13 minutes. The coating applied in this manner had a film weight of 5.8 milligrams per square inch.

Several of the strips coated with liquid polybutadiene as described above were tested by the wedge bend test. To make the wedge bend test, strips 4 inches by 1½ inches were cut from the coated plate. These strips were then preformed with the coated side up, by bending over a preformer made from one-quarter-inch rod. The strips are formed by placing them lengthwise along the rod and bending them into a U-shape approximately ¾ inch on a side. These preformed strips were then placed in the wedge bend apparatus and a 3.5 pound weight released. The anvil on the wedge bend apparatus was designed so that one end of the preformed strip was mashed together and the other end retained the original U-shape. The measurement reported was determined after placing the specimen in a 5 percent copper sulfate solution to which a few drops of $H_2SO_4$ acid were added for two minutes, to develop the fracture of the coating after which the specimen was rinsed with tap water. The length of the continuous fracture was measured with a ruler and recorded in 1/16 inch.

The liquid polybutadiene coated strips, as tested by the wedge bend test described above, were fractured for a distance of 27/16 inches (an average of 11 wedge bend tests).

EXAMPLE II

Various coating compositions of liquid polybutadiene containing a minor proportion of alkyd resin were made up. Each composition was diluted to 20 percent by weight non-volatile matter with toluene. Each composition was roller-coated onto both electrolytic and hot-dipped tin-plate strips and baked at 400° F. for 15 minutes. The coatings had essentially the same film weight. Three wedge bend tests, as described in Example I, were run on each coated strip. The average of these runs are expressed below in Table I. The liquid polybutadiene used was identical with that of Example I, while the alkyd used was a linseed oil modified, phthalic anhydride glycerol alkyd prepared from 54 percent oil and 30.5 percent anhydride sold under the trade name of Syntex 55.

Table I

| Composition (Ratio of Weight Percentages) | Wedge Bend Fracture in 1/16 Inch (Avg. of 3) | |
|---|---|---|
| | Electrolytic | Hot Dipped |
| 95/5 liquid polybutadiene-alkyd | 18 | 22 |
| 90/10 liquid polybutadiene-alkyd | 18 | 19 |
| 85/15 liquid polybutadiene-alkyd | 20 | 20 |
| 80/20 liquid polybutadiene-alkyd | 14 | 14 |
| 100% liquid polybutadiene* | 27 | 27 |

*See Example I.

This example shows that only a small amount of alkyd resin greatly improves the wedge bend characteristics of a liquid polymer of a conjugated diene.

EXAMPLE III

An unsaturated oil modified alkyd resin was prepared in the following manner: 885 grams of dehydrated castor oil, 92 grams of glycerol and 1 gram of calcium hydroxide were charged to a 2 liter flask fitted with a reflux condenser and an electric heating mantle. The heat was turned on, and after 2 hours, the temperature had reached 240° C. At this stage, the dilution test indicated that the desired ester interchange had taken place, so after an additional 15 minutes, 146 grams of adipic acid was charged. After one hour, the temperature had reached 220° C. after a drop to 195° C. when the adipic acid was added. The temperature was held constant at 220° C. by adding xylene through the reflux condenser. After five and one-half hours at this temperature, the heat was turned off and the alkyd resin recovered. 2.41 pounds of non-volatile material (alkyd) was found to be present. This was diluted with xylene to produce a solution of oil modified alkyd containing 66⅔ percent non-volatile matter.

One hundred fifty grams of the oil modified alkyd solution as prepared above and 450 grams of 66 percent by weight liquid polybutadiene (identical with that of Example I) in toluene were mixed together. This mixture thus contained non-volatile material of which 75 percent (by weight) was liquid polybutadiene and 25 percent oil modified alkyd resin. Another mixture was also made up in a similar manner which contained 87½ percent by weight liquid polybutadiene (percentage of non-volatile) and 12½ percent of the oil modified alkyd.

The alkyd-liquid polybutadiene mixtures were applied to tinned strips by roller coating, baked, and tested by the wedge bend test. The results of these runs are expressed below in Table II.

Table I

| Composition (Wt. Percent-Ratio) | Roller Setting (Inches) | Baking Time (mins.) | Baking Temp., °F. | Film Wt. (Milligrams per sq. in.) | Wedge Bend Fracture in Inches (avg. of 10 tests) |
|---|---|---|---|---|---|
| 75/25-liquid polybutadiene-alkyd | .003 | 13 | 400 | 6.1 | 17-5/16 |
| 87½/12½-liquid polybutadiene-alkyd | .003 | 13 | 400 | 6.3 | 22-3/16 |
| 100% liquid polybutadiene* | .003 | 13 | 400 | 5.8 | 3 7/16 |

*This data from Example I.

EXAMPLE IV

A series of compositions have been prepared and evaluated with respect to fabrication and processing properties. Data on these tests are tabulated below.

| Test a | Composition b | | Wedge Bend, in/16 | Processing Dog Food at 250° F. | | |
|---|---|---|---|---|---|---|
| | Pbd. | Alkyd | | Time, min. | Ad | Sulfide Stain |
| 1 | 100 | | 25 | 60 | 100 | 0-1 |
| 2 | 87.5 | 12.5 | 22 | 60 | 100 | 1 |
| 3 | 75 | 25 | 20 | 60 | 50 | 2 |
| 4 | 50 | 50 | 18 | 60 | 70 | 3 |
| 5 | 87.5 | 12.5 | 18 | 60 | 100 | 2 |
| 6 | 75 | 25 | 15 | 60 | 90 | 3 |
| 7 | 50 | 50 | 11 | 60 | 90 | 3 | a Runs 2, 3, 4 used Cook's alkyd. Runs 5, 6, 7 used soya-adipic alkyd.
b Coatings were about 5.5 mg./in.²

Liquid polybutadiene is readily prepared from readily available materials, and has been prepared for many uses. For that reason, this invention has been illustrated with liquid polybutadiene, however, other liquid polymers of conjugated dienes are also applicable. Those in the art will see many modifications which can be made without departing from the scope of this invention. It will also be understood by those skilled in the art that while these compositions are particularly adaptable to metal as coatings, they are also useful as coatings for other surfaces.

I claim:

1. A method of preparing a coated metal particularly suited for use in can manufacture which comprises applying a substantially uniform coating in the range of 1 to 10 milligrams per square inch to said metal of a composition comprising an organic solvent solution containing 20 to 70 weight percent of (A) 90 to 75 weight parts of a liquid polymer prepared by polymerizing monomeric materials comprising at least 50 weight parts per 100 parts total monomers of a conjugated diene of 4 to 6 carbon atoms, said liquid polymer having a Saybolt Furol viscosity at 100° F. in the range of 100 to 6,000, and a molecular weight in the range of 300 to 3,000 and (B) 10 to 25 parts by weight of an alkyd resin prepared by esterifying a polyhydric alcohol containing not more than 15 carbon atoms per molecule with a polycarboxylic acid containing not more than 15 carbon atoms per molecule, said alkyd resin being modified with 2 to 6 weight parts of a vegetable drying oil per part polyhydric alcohol, and curing said coating on said metal at a temperature in the range of 65 to 600° F.

2. The method of claim 1 wherein the conjugated diene is 1,3-butadiene, the polyhydric alcohol is a glycerol, the polycarboxylic acid is a dicarboxylic acid, the 1,3-butadiene comprises at least 70 weight percent of said monomers, and the liquid polymer has a Saybolt Furol viscosity at 100° F. in the range of 100 to 2,000.

3. The method of claim 2 wherein the coating is applied by rolling on.

4. A coating composition comprising per 100 weight parts (A) 70 to 99 weight parts of a liquid polymer having a Saybolt Furol viscosity at 100° F. in the range 100 to 6,000 and a molecular weight in the range 300 to 3,000, said liquid polymer having been prepared by polymerizing monomeric material comprising at least 50 weight percent of a conjugated diene of 4 to 6 carbon atoms and (B) 1 to 30 weight parts of an alkyd resin prepared by the esterification of a polyhydric alcohol containing not more than 15 carbon atoms per molecule with a polycarboxylic acid containing not more than 15 carbon atoms per molecule, said alkyd resin being modified with 2 to 6 parts of a vegetable modifying oil per part of said polyhydric alcohol.

5. A coating composition for metals having superior fabricating properties, said composition comprising per 100 weight parts (A) 75 to 90 weight parts of a liquid polymer prepared by polymerizing monomeric materials comprising at least 50 weight percent of a conjugated diene of 4 to 6 carbon atoms and having a Saybolt Furol viscosity at 100° F. in the range 100 to 6,000 and a molecular weight in the range 300 to 3,000, and (B) 10 to 25 weight parts of an alkyd resin prepared by the esterification of a polyhydric alcohol containing not more than 15 carbon atoms per molecule with a polycarboxylic acid containing not more than 15 carbon atoms per molecule, said alkyd resin being modified with 2 to 6 parts of a vegetable modifying oil per part of said polyhydric alcohol.

6. The composition of claim 5 wherein the conjugated diene is 1,3-butadiene, the polyhydric alcohol is a glycerol, the polycarboxylic acid is a dicarboxylic acid and the vegetable modifying oil is a drying oil.

7. A coating composition comprising 30 to 80 weight percent of an organic solvent and 20 to 70 weight percent of a mixture of (A) 75 to 90 weight parts per 100 parts of said mixture of a liquid polymer having a Saybolt Furol viscosity at 100° F. in the range 100 to 6,000 and a molecular weight in the range 300 to 3,000 and prepared by polymerizing monomeric materials comprising at least 50 weight percent of a conjugated diene of 4 to 6 carbon atoms, and (B) 10 to 25 weight part per 100 parts of said mixture of an alkyd resin prepared by the esterification of a polyhydric alcohol containing not more than 15 carbon atoms per molecule with a polycarboxylic acid containing not more than 15 carbon atoms per molecule, said alkyd resin being modified with 2 to 6 parts of a drying vegetable modifying oil per part of said polyhydric alcohol.

8. A metal surface coated with a composition comprising the thermoset product of (A) 75 to 90 weight parts per 100 parts of total mixture of a liquid polymer prepared by polymerizing monomeric materials comprising at least 50 weight percent of a conjugated diene of 4 to 6 carbon atoms, said liquid polymer having a Saybolt Furol viscosity at 100° F. in the range 100 to 6,000 and a molecular weight in the range 300 to 3,000, and (B) 10 to 25 weight parts per 100 parts mixture of an alkyd resin prepared by esterification of a polyhydric alcohol containing not more than 15 carbon atoms per molecule with a polycarboxylic acid containing not more than 15 carbon atoms per molecule, said alkyd resin being modified with 2 to 6 parts of a vegetable modifying oil per part of said polyhydric alcohol, said thermoset product being coated on a metal base.

9. The coated metal surface of claim 8 wherein said coating has a weight in the range 1 to 25 milligrams per square inch of coating.

References Cited in the file of this patent

UNITED STATES PATENTS 2,662,862     Crouch ---------------- Dec. 15, 1953

FOREIGN PATENTS 616,291     Great Britain ----------- Jan. 19, 1949